Patented July 12, 1932

1,866,717

UNITED STATES PATENT OFFICE

KURT H. MEYER, OF MANNHEIM, AND HEINRICH HOPFF, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF AROMATIC CARBOXYLIC ACID

No Drawing. Application filed October 23, 1928, Serial No. 314,539, and in Germany December 10, 1927.

The present invention relates to the production of aromatic carboxylic acids.

We have found that aromatic carboxylic acids are produced in a very satisfactory manner by allowing carbon dioxid to act, under pressure and at an elevated temperature, on aromatic hydrocarbons or their monohalogen derivatives, containing at least 2 hydrogen atoms connected to carbon atoms of the aromatic nucleus, in the presence of anhydrous aluminium chlorid. For example, a good yield of benzoic acid is obtained by treating benzene with carbon dioxide, under pressure and at about 100° C. in the presence of anhydrous aluminium chlorid. The pressure to be employed may be varied within wide limits, but 10 atmospheres should be exceeded. The temperature employed may range from 50° to 200° C., but the range of from 80 to 150° C. has been proved most efficient. Other aromatic hydrocarbons, such as toluene, xylenes, or their derivatives, such as chlorotoluenes and the like, may also be similarly used instead of benzene.

In place of anhydrous aluminium chlorid, other halides of aluminium may be employed.

We are well aware that traces of benzoic acid have been obtained by passing a current of carbon dioxide through benzene in the presence of aluminium chloride, while heating at atmospheric pressure. Indeed, for example, by heating 600 parts of benzene together with 135 parts of aluminium chloride for 30 hours to the boiling point of the benzene while passing through a current of carbon dioxide at atmospheric pressure, 1.2 parts of benzoic acid are obtained. In contrast thereto, when working in accordance with the present invention with the same quantities of benzene and of aluminium chloride in a closed vessel at 100° C. and pressing in carbon dioxide until a pressure of 50 atmospheres is attained, 40 parts of benzoic acid are obtained which quantity corresponds to more than 33 times that obtainable when working at atmospheric pressure in the manner mentioned above.

The following examples will further illustrate the nature of the said invention which however is not limited thereto. The parts are by weight.

Example 1

A high-pressure autoclave, fitted with stirrers, is charged with 100 parts of benzene and 50 parts of anhydrous aluminium chlorid, the air being expelled by the repeated introduction of carbon dioxid under pressure and subsequent expansion; at last carbon dioxid is brought therein under a pressure of about 60 atmospheres and the contents heated to 100° C. while stirring. After from 12 to 15 hours, the surplus carbon dioxid is discharged, the viscous reaction product is decomposed with ice and after the addition of concentrated hydrochloric acid, is extracted with benzene. After distilling off the benzene, there remains a grey cake of crude benzoic acid which contains a considerable amount of benzophenone and which can be purified by any known and suitable means whereby 15 parts of benzoic acid are obtained.

The initial benzene may be replaced by other aromatic hydrocarbons or their derivatives, such as chlorbenzene, toluene, xylenes chlorotoluenes, and the like.

Example 2

400 parts of chlorobenzene and 250 parts of anhydrous aluminium bromid are heated with carbon dioxid under a pressure of from 50 to 60 atmospheres to about 100° C. for 30 hours while stirring, whereupon the reaction product is worked up as described in Example 1. The chloro-benzoic acid obtained melts at from 235 to 237° C. Besides the 25 parts of said acid small quantities of p,p'-dichlorobenzophenone are also obtained.

Example 3

400 parts of toluene are treated together with 150 parts of anhydrous aluminium chlorid as described in the foregoing examples, whereby a good yield of about 26 parts of p-toluylic acid and small quantities of p,p'-dimenthylbenzophenone are obtained. When commercial xylene is employed in the place of toluene the corresponding xylic acids, principally 1.3.4-xylic acid, with a melting point of 126° C. are obtained together with some tetramethylbenzophenone with a melting point of 332° to 334° C.

What we claim is:

1. The process of producing aromatic carboxylic acids, which comprises acting with carbon dioxid on an aromatic compound selected from the group consisting of hydrocarbons and mono-halogen derivatives thereof, containing at least 2 hydrogen atoms connected to carbon atoms of the aromatic nucleus in the liquefied state in the presence of a halide of aluminium at a pressure above 10 atmospheres while heating.

2. The process of producing aromatic carboxylic acids, which comprises acting with carbon dioxid on an aromatic hydrocarbon, containing at least 3 hydrogen atoms connected to carbon atoms of the aromatic nucleus, in the liquefied state in the presence of a halide of aluminium at a pressure above 10 atmospheres while heating to a temperature of from 80° to 150° C.

3. The process of producing aromatic carboxylic acids, which comprises acting with carbon dioxid on an aromatic liquid hydrocarbon containing at least 3 hydrogen atoms connected to carbon atoms of the aromatic nucleus in the presence of anhydrous aluminium chlorid at a pressure above 10 atmospheres while heating to a temperature of from 80° to 150° C.

4. The process of producing aromatic carboxylic acids, which comprises acting with carbon dioxid on an aromatic liquid hydrocarbon containing at least 3 hydrogen atoms connected to carbon atoms of the aromatic necleus in the presence of hydrous aluminium chlorid at a pressure of about 60 atmospheres while stirring and heating to about 100° C.

5. The process of producing benzoic acid, which comprises acting with carbon dioxid on benzene in the presence of anhydrous aluminium chlorid at a pressure of about 60 atmospheres while stirring and heating to about 100° C.

In testimony whereof we have hereunto set our hands.

KURT H. MEYER.
HEINRICH HOPFF.